(12) United States Patent
Clemens et al.

(10) Patent No.: US 8,704,693 B1
(45) Date of Patent: Apr. 22, 2014

(54) SIGNAL INTERFACE SYSTEM AND METHOD

(71) Applicant: General Electric Company, Schenectady, NY (US)

(72) Inventors: Steven Thomas Clemens, Carson City, NV (US); Garth Maury Jackson, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/688,309

(22) Filed: Nov. 29, 2012

(51) Int. Cl.
*H03M 1/12* (2006.01)

(52) U.S. Cl.
USPC .......................................... 341/155; 341/141

(58) Field of Classification Search
USPC .................................................. 341/141, 155
See application file for complete search history.

(56) References Cited

U.S. PATENT DOCUMENTS

| | | | |
|---|---|---|---|
| 6,448,914 B1 * | 9/2002 | Younis et al. | 341/141 |
| 6,587,942 B1 * | 7/2003 | Chiang | 713/100 |
| 7,369,078 B2 * | 5/2008 | Nickel et al. | 341/155 |
| 8,009,078 B1 | 8/2011 | Alley | |
| 8,054,208 B2 | 11/2011 | Fletcher et al. | |

* cited by examiner

*Primary Examiner* — Khai M Nguyen
(74) *Attorney, Agent, or Firm* — Fletcher Yoder, P.C.

(57) ABSTRACT

A signal interface system and method of interfacing signal input sources with user output destination devices are provided. The signal interface system is configurable to accept one of a plurality of types of inputs. The signal interface system includes a common section, and a module section including two or more monitor modules. The two or more monitor modules condition a received signal for consumption by a user output destination device. The common input section allows monitor modules to be removed without impacting the function of other monitor modules in the system. The signal interface accepts either discrete inputs or process variable current inputs.

20 Claims, 3 Drawing Sheets ized input signals, and more particularly, to methods of interfacing signal input sources with user output destination devices.

SIGNAL INTERFACE SYSTEM AND METHOD

BACKGROUND OF THE INVENTION

The present disclosure relates generally to signal interface systems for use in receiving different types of signal inputs, and more particularly, to methods of interfacing signal input sources with user output destination devices.

In complex control and/or measurement systems for use, for example, in monitoring and controlling the operation of machines, it is frequently necessary to monitor and/or sense different types of input signals, such as thermocouple inputs, RTDs (resistance temperature detectors), continuously variable current signals, voltage signals, and process variable type inputs. Typically, in order to address the different input types, separate hardware signal interfaces, each configured to accept a single different type of input, are used.

In addition, for control and/or measurement systems intended for commercial use, requirements are often imposed by relevant regulatory agencies that the control and/or measurement systems incorporate redundancy features, for increased reliability. Such redundancy features can substantially increase the cost, size, and complexity of the equipment, and can place demands upon the designers and fabricators of such equipment to ensure that all the necessary circuitry fits within a predefined package size and volume. Accordingly, it would be desirable to provide a signal interface system that is capable of receiving and transferring different types of inputs while simultaneously providing a level of functional redundancy that may be required in order to make the equipment using the signal interface system compliant with applicable laws and/or regulations.

BRIEF DESCRIPTION OF THE INVENTION

In an aspect, a signal interface system is provided. The system includes a common front-end section, coupleable in communication to a signal input source, wherein the signal input source is one of a discrete input source and a process variable input source. The system also includes a monitor module section coupleable in communication with the common front-end section. The monitor module section is configurable to receive one of a discrete input signal and a process variable input signal from the signal input source. The monitor module section is also coupleable to a user output destination device.

In another aspect, a method for interfacing a signal input source with a user output destination device is provided. The method includes providing a common-front end section, coupleable in communication to a signal input source, wherein the signal input source is one of a discrete input source and a process variable input source. The method also includes coupling a monitor module section in communication with the common front-end section, the monitor module section configurable to receive one of a discrete input signal and a process variable input signal from the signal input source. The method also includes coupling the monitor module section to a user output destination device. The method also includes receiving at least one user instruction at the monitor module section.

DETAILED DESCRIPTION OF THE INVENTION

Although specific features of various embodiments of the invention may be shown in some drawings and not in others, this is for convenience only. In accordance with the principles of the invention, any feature of a drawing may be referenced and/or claimed in combination with any feature of any other drawing.

Figure 1:
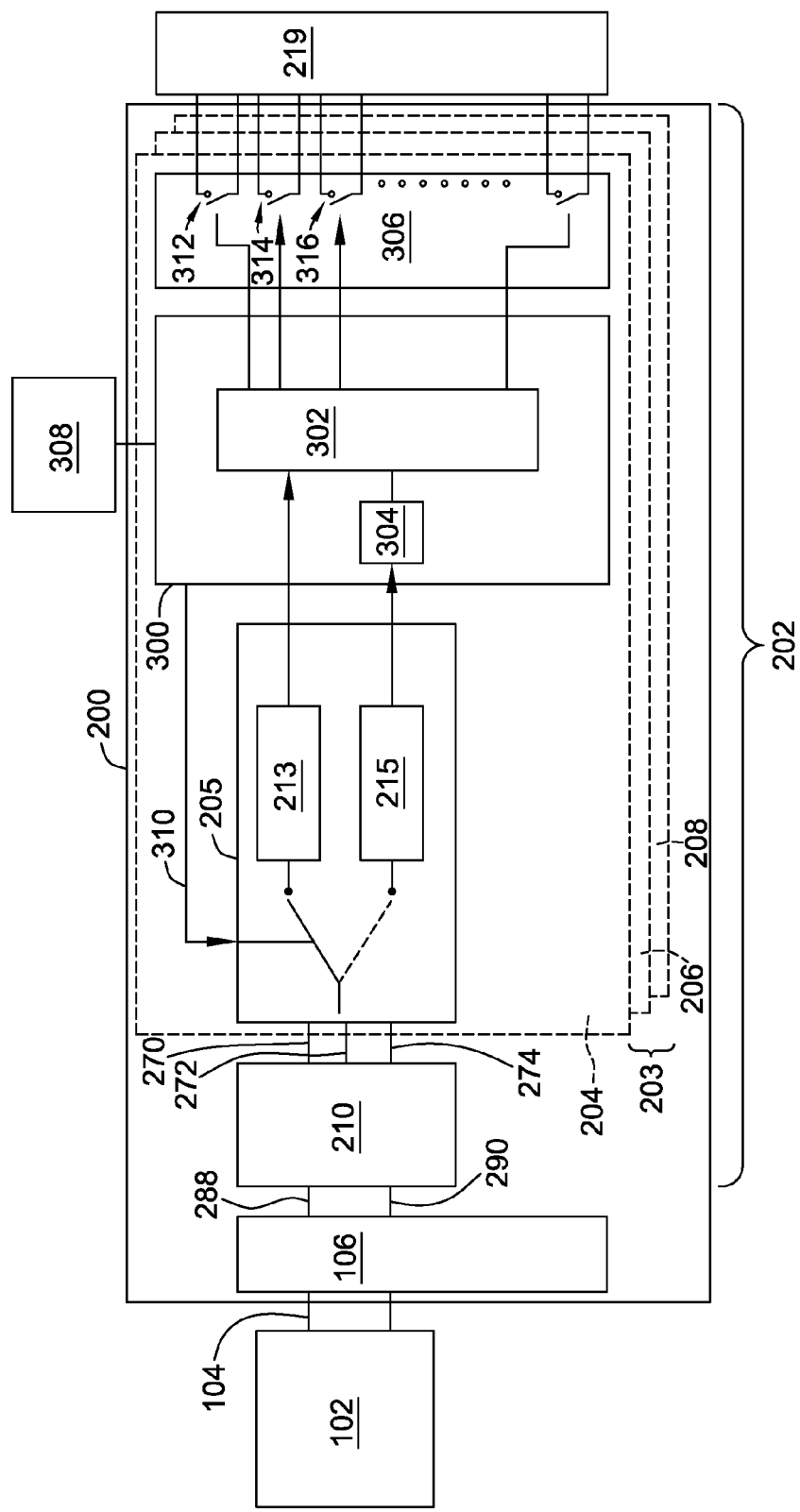
FIG. 1 is a schematic illustration of a monitoring and measurement system in which an exemplary signal interface system is used.

FIG. 1 is a schematic illustration of an exemplary environment 100 in which an exemplary signal interface system 200 is used. Environment 100 includes one or more input sources 102. Signal interface system 200 is configurable to accept different types of input sources 102, such as a discrete input source 212 (illustrated and described with respect to FIG. 2) or such as a process variable input source 214 (illustrated and described with respect to FIG. 3). A discrete input source produces a discrete on/off (or digital) signal as an output, and is typically a high impedance input, on the order of thousands or even millions of Ohms. A typical discrete input source is a relay contact or any other simple ON/OFF switch. A process variable input source produces a continuously variable current signal as an output, with the output current, in the exemplary embodiment, for example, in the range of 4-20 mA, with a low impedance on the order of hundreds of Ohms. A typical process variable input signal source is a recorder, a transmitter, a gauge, and/or other device that produces a continuous, but varying, current signal.

Signal interface system 200 includes a signal interface 202. Signal interface 202 is electrically coupleable to signal input source 102. Signal interface 202 is also coupleable to one or more user output destination device(s) 219 that ultimately consume(s) the signal produced from signal input source 102. Signal interface 202 receives signals from signal input source 102 via a field wiring arrangement 104 coupled to a terminal block 106. Terminal block 106 is coupled via a pair of contacts 288 and 290 to a single common front-end section 210. Common front-end section 210 is, in turn, coupled to a monitor module section 203 via a set of contacts 270, 272, and 274. Monitor module section 203 includes, in the exemplary embodiment, a set of identical monitor modules 204, 206, and 208, which are coupled in parallel to the output of common front-end section 210.

Monitor module 204 includes a configurable input channel 205. Input channel 205 includes a discrete input conditioner block 213 and a process variable input conditioner block 215. A processing unit 300 is coupled to configurable input channel 205, specifically, to receive the output from each of discrete input conditioner block 213 and process variable input conditioner block 215. Discrete input conditioner block 213 is coupled directly to an alarm unit 302 within processing unit 300. Process variable input conditioner block 215 is coupled to an analog-to-digital converter ("ADC") 304 that is coupled to alarm unit 302. ADC 304 receives a continuous waveform output from process variable input conditioner block 215 and converts it to a digital output. Processing unit 300 is coupled to a relay output block 306 that is coupled to one or more user output destination device(s) 219. As described above, monitor modules 206 and 208 preferably are structurally and functionally identical to monitor module 204, are likewise provided with discrete input conditioner blocks and process variable input conditioner blocks, and are coupled in parallel with monitor module 204 to common front-end section 210 and to user output destination device(s) 219.

In the exemplary embodiment, signal interface system 200 is used either to receive and condition a digital input, or to receive, condition and convert a variable current input to a digital output, for transmission to a device as a simple ON/OFF status indicator, such as are used in monitoring and shutoff systems for machinery. Accordingly, processing unit 300 is configured to transmit to relay output block 306 one or more simple ON/OFF signals that cause the actuation of one or more of relays 312, 314, 316, etc. The actuation of one or more of relays 312, 314, 316, etc., causes ON/OFF signals to be transmitted to user output destination device(s) 219, to cause the actuation and/or shutoff of devices (not shown) as defined by the user. For example, a signal from signal input source 102 may represent an overspeed condition of a turbine, and the resulting relay actuation in relay output block 306 causes actuation of an emergency shutdown system (user output destination device 219).

Figure 2:
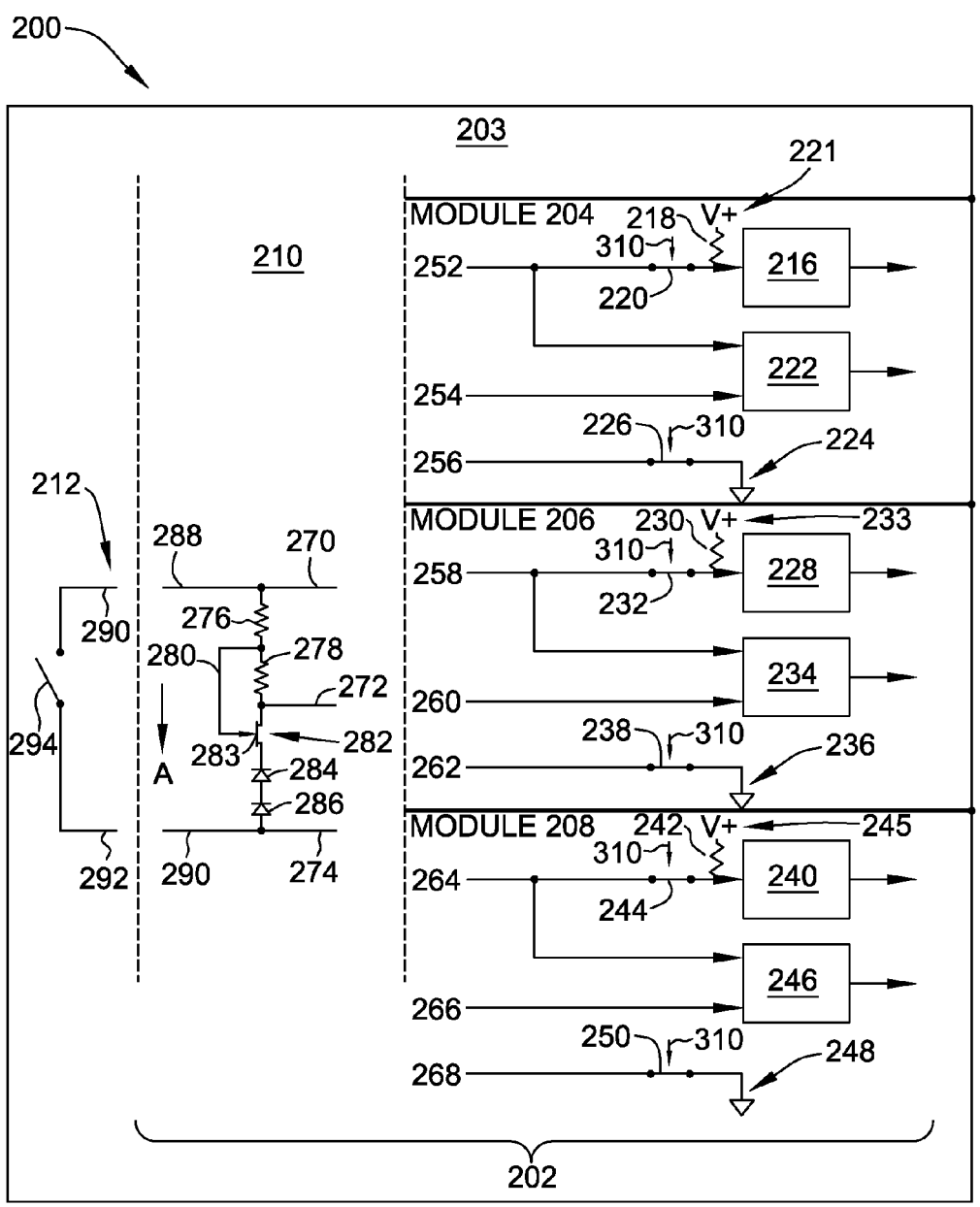
FIG. 2 is a circuit diagram illustrating an exemplary signal interface system configured to receive a discrete input signal.
Figure 3:
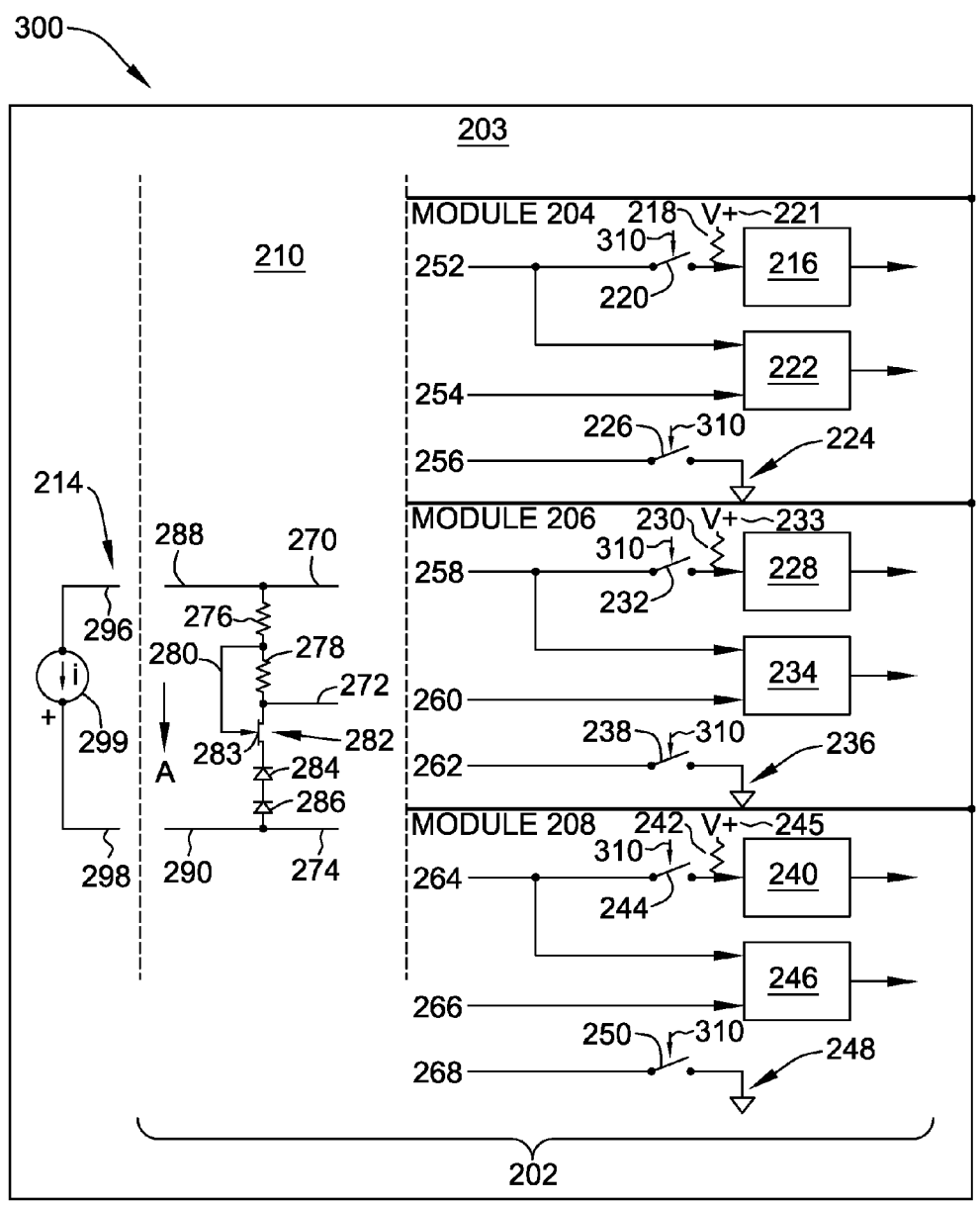
FIG. 3 is a circuit diagram illustrating an exemplary signal interface system configured to receive a process variable input signal.

In the exemplary embodiment, signal interface systems 200 will be configured in groups, with a representative group including ten or more signal interface systems 200, each of which will be coupled with either a discrete input source 212 (illustrated in FIG. 2), or with a process variable input source 214 (illustrated in FIG. 3). A user will select the type of input source to which a specific signal interface system 200 will be coupled. Processing unit 300 includes one or more suitably configured processors and related devices as required enabling signal interface system 200 to function as described herein. Processing unit 300 receives at least one user instruction 308, and is configured to, for example, receive and process signals received from discrete input conditioner block 213 and disregard signals received from process variable input conditioner block 215. Alternatively, after receipt of at least one user instruction 308, processing unit 300 is configured to receive and process signals received from process variable input conditioner block 215 and disregard signals received from discrete input conditioner block 213. Depending upon the user instruction 308 received by processing unit 300, configurable input channel 205 receives channel configuration signal 310 from processing unit 300, which causes configurable input channel 205 to apply a voltage to each of wetting resistors 218, 230, and 242, in turn causing switches 220, 232, and 244 to either open or close, depending upon whether each of configurable input channels 205 is being configured to receive a discrete input signal or a process variable input signal.

As used herein, the term "processor" is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

FIG. 2 is a circuit diagram illustrating signal interface 202, and illustrating the discrete input mode of operation. Signal interface 202 includes a monitor module section 203. As described above, monitor module section 203 includes three separate, but identical, monitor modules 204, 206 and 208 that are coupled in parallel to a common front-end section 210. Common front-end section 210, in turn, is coupleable to one of discrete input source 212 (shown in FIG. 2) and process variable input source 214 (shown in FIG. 3). For ease of illustration, processing unit 300 and relay output block 306 of monitor module 204, and corresponding processing units and relay output blocks for monitor modules 206 and 208 have been omitted from FIG. 2.

Monitor module 204 includes a contact 252 coupled through suitable wiring and/or other connector(s) to a switch 220. Switch 220 is coupled to a wetting resistor 218 that is coupled to a discrete input conditioner 216. Wetting resistor 218 is also coupled to a first voltage 221. Discrete input conditioner 216 is coupled to user output destination device (s) 219 that consume(s) the output from the discrete input conditioner 216. Contact 252 is also coupled in parallel to a process variable input conditioner 222 that is also coupled to user output destination device(s) 219. A contact 254 is coupled to process variable input conditioner 222. A contact 256 is coupled through a switch 226 to a ground 224. Discrete input conditioner 216, wetting resistor 218, switch 220, ground 224 and switch 226 function together to perform the functions of discrete input conditioner block 213 (illustrated in FIG. 1). Process variable input conditioner 222, ground 224 and switch 226 function together to perform the functions of a process variable input conditioner block 215 (illustrated in FIG. 1).

Monitor module 206 includes a contact 258 coupled through suitable wiring and/or other connector(s) to a switch 232. Switch 232 is coupled to a wetting resistor 230 that is coupled to a discrete input conditioner 228. Wetting resistor 230 is also coupled to a first voltage 233. Discrete input conditioner 228 is coupled to user output destination device (s) 219 that consume(s) the output from the discrete input conditioner 228. Contact 258 is also coupled in parallel to a process variable input conditioner 234 that is also coupled to user output destination device(s) 219. A contact 260 is also coupled to process variable input conditioner 234. A contact 262 is coupled through a switch 238 to a ground 236.

Monitor module 208 includes a contact 264 coupled through suitable wiring and/or other connector(s) to a switch 244. Switch 244 is coupled to a wetting resistor 242 that is coupled to a discrete input conditioner 240. Wetting resistor 242 is also coupled to a first voltage 245. Discrete input conditioner 240 is coupled to user output destination device (s) 219 that consume(s) the output from the discrete input conditioner 240. Contact 264 is also coupled in parallel to a process variable input conditioner 246 that is also coupled to user output destination device(s) 219. A contact 266 is also coupled to process variable input conditioner 246. A contact 268 is coupled through a switch 250 to a ground 248.

Each of discrete input conditioners 216, 228, and 240, and each of process variable input conditioners 222, 234, and 246 is configured to operate in a signal conditioning function, to increase the gain of their corresponding outputs, and/or otherwise adjust their corresponding outputs, so as to make their outputs suitable for consumption by the user output destination device(s) 219 to which signal interface 202 is coupled.

Common front-end section 210 includes a contact 270 and a contact 288, both coupled to a resistor 276, which is coupled to a resistor 278. Resistor 278 is coupled to a contact 272. Contact 272 is coupled to a J-FET 282. J-FET 282 is coupled in series to a diode 284 and a diode 286. Diode 286 is coupled to a contact 274 and a contact 290. In the exemplary embodiment, resistors 276 and 278 are rated at 100 Ohms. In alternative embodiments, other value resistors may be used as required to enable signal interface 202 to function as described herein. Bias voltage connection 280 couples a gate terminal 283 in J-FET 282 to a location in common front-end section 210 between resistors 276 and 278. Monitor modules 204, 206, and 208 are coupled, in parallel, to common front-end section 210. Specifically, contacts 252, 258, and 264 are coupled to common section contact 270. Contacts 254, 260, and 266 are coupled to common section contact 272. Contacts 256, 262, and 268 are coupled to common section contact 274. Additional monitor modules may be connected in a similar parallel manner if the application demands it.

FIG. 2 illustrates signal interface system 200, as configured to operate in discrete input mode (or "DI mode"), for use in interfacing discrete input source 212 with user destination output device 219. Common front-end section 210 is coupled to discrete input source 212. Discrete input source 212 includes a contact 290 and a contact 292. A discrete ("on/off") input signal is represented by a switch 294. When signal interface 202 is in DI mode the input signal from discrete input source 212 is simply an open circuit or a short circuit that indicates either an "OFF" status or an "ON" status from discrete input source 212. Processing unit 300 receives at least one user instruction 308 (shown in FIG. 1) that dictates that signal interface system 200 is to be used with a discrete input source. Processing unit 300 transmits a channel configuration signal 310 to configurable input channels 205 in each of monitor modules 204, 206 and 208. Wetting resistors 218, 230 and 242 are always energized by voltages 221, 233 and 245, and do not control the switches 220, 232 and 244. The signal 310 directly actuates the position of switches 220, 232 and 244 in FIG. 2 allowing the signals to pass to the discrete input conditioners 216, 228 and 240. Wetting resistors 218, 230, and 242 reverse bias diodes 284 and 286 so that current flows in the user supplied discrete input source 212 when contact 294 is closed in the direction of arrow A, as illustrated in FIG. 2.

Signal interface system 200 enables one or more of monitor modules 204, 206, and 208 to be removed, and/or similar monitor modules to be added in parallel, to existing monitor modules 204, 206, and 208, without requiring adjustment and/or redesign of signal interface system 200. Signal interface system 200 further performs a current limiting function to prevent high voltages from damaging resistors 276 and 278 in common front-end section 210. Specifically, as the applied voltage across resistors 276 and 278 increases, J-FET 282 gradually limits the amount of current permitted to flow through resistors 276 and 278. In an exemplary embodiment, a maximum current of 22.5-25 mA through J-FET 282 is permitted. This allows for maximum current requirements in the common front-end section 210 to be reduced, resulting in a smaller overall device size. In the exemplary embodiment, processing unit 300 is programmed such that when operating in DI mode, signals received from process variable input conditioners 222, 234, and 246 are not responded to.

FIG. 3 is a circuit diagram illustrating the configuration of signal interface 202 for process variable ("PV") input mode of operation, for use in interfacing process variable input source 214 with user output destination device 219. Processing unit 300 and relay output block 306 of monitor module 204, and corresponding processing units and relay output blocks for monitor modules 206 and 208 have been omitted from FIG. 3. After receipt of at least one user instruction 308 (shown in FIG. 1) indicating that signal interface system 200 is to be connected to a process variable input source 214, processing unit 300 (shown in FIG. 1) transmits a channel configuration signal 310. The wetting resistors 218, 230 and 242 are always energized by voltages 221, 233 and 245, and do not control the switches 220, 232 and 244. Signal 310 directly actuates the position of switches 220, 232 and 244 in FIG. 3 allowing the signals to pass to the process variable input conditioners 222, 234 and 246. Channel configuration signal 310 cause switches 220, 232, and 244, respectively, to open, preventing signals from passing through discrete input conditioners 216, 228, and 240, respectively. Accordingly, signals pass through process variable input conditioners 222, 234, and 246, and are transmitted to ADC 304.

In contrast to known signal input interface systems, the signal input interface systems described herein are configurable to be used with both discrete input signal sources and process variable input signal sources, providing for increased flexibility in establishing monitoring and control systems. In addition, the signal interface systems described herein provide multiple redundancies in the sections of the signal interface that provide conditioning of the signals, for increased reliability.

Exemplary embodiments of a method for interfacing a signal input source with a user output destination device are described above in detail. The system and method are not limited to the specific embodiments described herein, but rather, steps of the methods and/or components of the systems may be utilized independently and separately from other steps and/or components described herein. For example, the systems and methods described herein may be used in combination with other measurement, monitoring and control systems, and are not limited to practice with only the components as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A signal interface system comprising:
    a common front-end section, coupleable in communication to a signal input source, wherein the signal input source is one of a discrete input source and a process variable input source; and
    a monitor module section coupleable in communication with the common front-end section, the monitor module section configurable to receive one of a discrete input signal and a process variable input signal from the signal input source, wherein the monitor module section is coupleable to a user output destination device.

2. A signal interface system in accordance with claim 1, wherein the monitor module section comprises a plurality of monitor modules coupleable in parallel communication with the common front-end section.

3. A signal interface system in accordance with claim 1, wherein the monitor module comprises a configurable input channel coupleable in communication with the common front-end section, for receiving an output signal from the common front-end section, the configurable input channel including a discrete input conditioner and a process variable input conditioner.

4. A signal interface system in accordance with claim 3, wherein the monitor module comprises a processing unit coupleable in communication with the configurable input channel, for receiving an output signal from the configurable input channel.

5. A signal interface system in accordance with claim 4, wherein the processing unit comprises:
   an alarm unit coupleable directly to the discrete input conditioner, for receiving a digital output from the discrete input conditioner; and
   an analog-to-digital converter coupleable to the process variable input conditioner, for receiving an output from the process variable input, the analog-to-digital converter coupled to the alarm unit.

6. A signal interface system in accordance with claim 5, wherein the monitor module comprises a relay output block coupleable to the processing unit, for receiving a digital output from the processing unit.

7. A signal interface system in accordance with claim 2, wherein the monitor modules are coupleable in parallel communication with a user output destination device.

8. A signal interface system in accordance with claim 3, wherein the configurable input channel is configurable to accept one of a discrete input signal and a process variable input signal, after receipt of at least one user instruction at the monitor module section.

9. A signal interface system in accordance with claim 8, wherein the processing unit is configured to transmit a channel configuration signal to the configurable input channel.

10. A signal interface system in accordance with claim 9, wherein the configurable input channel includes a plurality of switching devices associated with the discrete signal conditioner and the process variable input conditioner, each of the switching devices configured for changing an open/closed status thereof, in response to receipt of the channel configuration signal from the processing unit.

11. A method for interfacing a signal input source with a user output destination device, said method comprising:
   providing a common-front end section, coupleable in communication to a signal input source, wherein the signal input source is one of a discrete input source and a process variable input source;
   coupling a monitor module section in communication with the common front-end section, the monitor module section configurable to receive one of a discrete input signal and a process variable input signal from the signal input source;
   coupling the monitor module section to a user output destination device; and
   receiving at least one user instruction at the monitor module section.

12. A method in accordance with claim 11, wherein coupling a monitor module section in communication with the common front-end section comprises coupling a plurality of monitor modules in parallel communication with the common front-end section.

13. A method in accordance with claim 11, wherein the monitor module comprises a configurable input channel coupleable in communication with the common front-end section, for receiving an output signal from the common front-end section, the configurable input channel including a discrete input conditioner and a process variable input conditioner.

14. A method in accordance with claim 13, wherein coupling a monitor module section with the common front-end section comprises coupling a processing unit in communication with the configurable input channel, for receiving an output signal from the configurable input channel.

15. A method in accordance with claim 14, wherein coupling a processing unit in communication with the configurable input channel comprises:
   coupling an alarm unit directly to the discrete input conditioner, for receiving a digital output from the discrete input conditioner;
   coupling an analog-to-digital converter to the process variable input conditioner, for receiving an output from the process variable input; and
   coupling the alarm unit to the analog-to-digital converter, for receiving a converted output from the process variable input conditioner.

16. A method in accordance with claim 15, wherein coupling a monitor module section in communication with the common front-end section comprises coupling a relay output block to the processing unit, for receiving a digital output from the processing unit.

17. A method in accordance with claim 12, further comprising coupling the monitor modules in parallel communication with a user output destination device.

18. A method in accordance with claim 13, further comprising configuring the configurable input channel to accept one of a discrete input signal and a process variable input signal, after receiving the at least one user instruction at the monitor module section.

19. A method in accordance with claim 18, wherein configuring the configurable input channel comprises receiving at the configurable input channel a channel configuration signal from the processing unit.

20. A method in accordance with claim 19, wherein the configurable input channel includes a plurality of switching devices associated with the discrete signal conditioner and the process variable input conditioner, and configuring the configurable input channel comprises changing an open/closed status for each of the plurality of switching devices, after receipt of the channel configuration signal from the processing unit.

* * * * *